US009487695B2

(12) United States Patent
Kim et al.

(10) Patent No.: US 9,487,695 B2
(45) Date of Patent: Nov. 8, 2016

(54) OPTICAL FILM AND OPTICAL DISPLAY DEVICE INCLUDING SAME

(71) Applicants: Jin Woo Kim, Uiwang-si (KR); Moon Soo Choi, Uiwang-si (KR); Gi Wook Kang, Uiwang-si (KR); Sang Cheon Park, Uiwang-si (KR); Chul Jin Park, Uiwang-si (KR); Hyoun Young Kim, Uiwang-si (KR); Jong Hyuk Eun, Uiwang-si (KR); Gyu Cheol Lee, Uiwang-si (KR); Mi Young Chae, Uiwang-si (KR)

(72) Inventors: Jin Woo Kim, Uiwang-si (KR); Moon Soo Choi, Uiwang-si (KR); Gi Wook Kang, Uiwang-si (KR); Sang Cheon Park, Uiwang-si (KR); Chul Jin Park, Uiwang-si (KR); Hyoun Young Kim, Uiwang-si (KR); Jong Hyuk Eun, Uiwang-si (KR); Gyu Cheol Lee, Uiwang-si (KR); Mi Young Chae, Uiwang-si (KR)

(73) Assignee: CHEIL INDUSTRIES, INC., Gumi-Si, Gyeongsangbuk-Do (KR)

( * ) Notice: Subject to any disclaimer, the term of this patent is extended or adjusted under 35 U.S.C. 154(b) by 103 days.

(21) Appl. No.: 14/363,133

(22) PCT Filed: Dec. 5, 2012

(86) PCT No.: PCT/KR2012/010448
§ 371 (c)(1),
(2) Date: Jun. 5, 2014

(87) PCT Pub. No.: WO2013/085261
PCT Pub. Date: Jun. 13, 2013

(65) Prior Publication Data
US 2015/0014589 A1 Jan. 15, 2015

(30) Foreign Application Priority Data

Dec. 5, 2011 (KR) .................. 10-2011-0129273
Sep. 14, 2012 (KR) .................. 10-2012-0102164

(51) Int. Cl.
G02B 5/04 (2006.01)
G02F 1/13357 (2006.01)
C09K 11/02 (2006.01)
B23B 3/30 (2006.01)
B32B 27/18 (2006.01)
C09K 11/06 (2006.01)
C09K 11/77 (2006.01)
B32B 27/08 (2006.01)
B32B 27/28 (2006.01)
B32B 27/30 (2006.01)
B32B 27/36 (2006.01)

(52) U.S. Cl.
CPC ............... *C09K 11/025* (2013.01); *B23B 3/30* (2013.01); *B32B 27/08* (2013.01); *B32B 27/18* (2013.01); *B32B 27/283* (2013.01); *B32B 27/308* (2013.01); *B32B 27/36* (2013.01); *C09K 11/06* (2013.01); *C09K 11/7797* (2013.01); *B32B 2250/02* (2013.01); *B32B 2270/00* (2013.01); *B32B 2307/308* (2013.01); *B32B 2307/412* (2013.01); *B32B 2307/422* (2013.01); *B32B 2307/584* (2013.01); *B32B 2457/202* (2013.01); *B32B 2457/20* (2013.01); *B32B 2457/202* (2013.01); *B32B 2551/00* (2013.01); *C09K 2211/1011* (2013.01); *C09K 2211/1014* (2013.01); *C09K 2211/1029* (2013.01); *C09K 2211/1033* (2013.01); *C09K 2211/1037* (2013.01); *C09K 2211/1044* (2013.01); *C09K 2211/185* (2013.01); *Y10T 428/24612* (2015.01)

(58) Field of Classification Search
CPC ............ C09K 11/02; C09K 2211/185; C09K 2211/1033; C09K 2211/1029; C09K 2211/1044; C09K 2211/1096; C09K 2211/1003; B32B 3/30; B32B 27/18
See application file for complete search history.

(56) References Cited

U.S. PATENT DOCUMENTS

| 6,514,594 | B1 * | 2/2003 | Wei | ............ | B32B 27/08 428/141 |
| 6,576,352 | B2 * | 6/2003 | Hirai | ............ | G02B 5/20 257/98 |
| 8,034,436 | B2 * | 10/2011 | Wei | ............ | B44C 3/02 252/301.35 |
| 2007/0031685 | A1 * | 2/2007 | Ko | ............ | C09K 11/02 428/447 |

(Continued)

FOREIGN PATENT DOCUMENTS

| EP | 1793261 | * | 6/2007 |
| KR | 10-2008-0018503 A | | 2/2008 |
| KR | 10-2008-0070530 A | | 7/2008 |
| KR | 10-2008-0110357 A | | 12/2008 |
| KR | 10-0961596 B1 | | 6/2010 |
| KR | 10-2011-0096966 A | | 8/2011 |
| TW | 200422733 A | | 11/2004 |
| TW | 200835939 A | | 9/2008 |
| TW | 200848770 A | | 12/2008 |

(Continued)

OTHER PUBLICATIONS

Office Action mailed Jul. 23, 2015 in corresponding Taiwanese Patent Application No. 101145674.

*Primary Examiner* — Carol M Koslow
(74) *Attorney, Agent, or Firm* — Lee & Morse, P.C.

(57) ABSTRACT

The present invention relates to an optical film and an optical display apparatus including the same. The optical film may include a base film and an optical functional layer formed on the base film, wherein at least one of the base film. The optical functional layer may include a luminescent material, and the luminescent material may include at least one of a fluorescent material and a phosphorescent material.

13 Claims, 1 Drawing Sheet

(56) References Cited

U.S. PATENT DOCUMENTS

| | | | | |
|---|---|---|---|---|
| 2007/0221865 A1* | 9/2007 | Sohn | ............... | C09K 11/7731 250/484.4 |
| 2008/0061686 A1* | 3/2008 | Liu | ............... | C09K 11/06 313/506 |
| 2009/0220742 A1* | 9/2009 | Wang | ............... | G02B 5/0226 428/147 |
| 2010/0060822 A1* | 3/2010 | Sun | ............... | C09K 11/7734 349/71 |
| 2012/0156436 A1* | 6/2012 | Kim | ............... | C09K 11/565 428/172 |

FOREIGN PATENT DOCUMENTS

| | | |
|---|---|---|
| TW | 200937043 A | 9/2009 |
| WO | WO 2010/116294 | * 10/2010 |

* cited by examiner

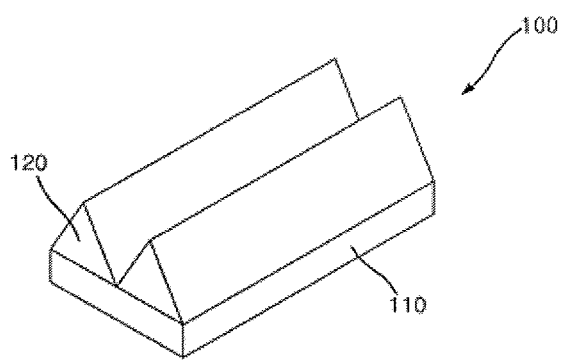

OPTICAL FILM AND OPTICAL DISPLAY DEVICE INCLUDING SAME

TECHNICAL FIELD

The present invention relates to an optical film and an optical display apparatus including the same. More particularly, the present invention relates to an optical film including a luminescent material and an optical display apparatus including the same.

BACKGROUND ART

In a liquid crystal display (LCD), the performance of image display devices using an optical film is greatly affected by the performance of a backlight unit. This is because the devices are based on control of amount of light by reflecting or transmitting the light through the optical film.

Various optical films having excellent optical performance have been suggested for effective application to image display devices. Among those optical films, a prism sheet is used to improve brightness of a liquid crystal display (LCD). Since an LCD cannot emit light by itself, it obtains light from a light source (CCFL or LED) and distributes the light to an overall area through a light guide plate. Then, the light is transformed to a surface light source having more uniform brightness through a diffusive sheet. In the course of this procedure, efficiency of light emitted from an initial light source is steadily reduced. If a prism sheet is used, brightness can be increased by changing side light to front light and collecting the reflected light.

The prism sheet used as a light collecting sheet is an optical film having thin-film flexibility, which forms an optical pattern structured such that a prism pattern is arranged in a linear array at one side, thereby improving brightness.

As the index of refraction increases, the properties of the prism film are improved, thereby realizing high brightness. As representative examples of conventional resins having high index of refraction, bromine-substituted epoxy resins are often used. For example, an epoxy resin produced by adding acrylic acid to a tetrabromobisphenol A type epoxy resin and a bisphenol A type epoxy resin and then mixing styrene, divinylbenzene, benzyl methacrylate, and the like to the resulting mixture may be used.

However, the epoxy resin has an index of refraction of 1.590, which is still low. Further, the epoxy resin also exhibits a low Abbe's number of 32, which needs further improvement in order to be used for optics. When halogen-based resins (such as, bromine-substituted epoxy resins) are combusted, they can generate carcinogens, such as polyhalogenated aromatic dioxin or polyhalogenated dibenzofuran. In addition, there have been problems that gas such as hydrogen bromide, hydrogen chloride and the like generated upon combustion can be harmful for human body and environment.

In addition, there have been developed optical materials having a urethane bond or thiocarbamoyl phosphate S-alkylester bond, which are formed by adding an internal release agent to a mixture of an aromatic polyisocyanate containing a sulfur atom and active hydrogen compounds, such as a polyol and a polythiol, and subjected to injection molding. However, these optical materials have low heat stability and thus have disadvantages in that the optical products are partially deformed upon hard coating.

Further, most resins having high index of refraction as listed above are not suited to mass production and production applications due to high viscosity, high cost, purity problems, and the like.

US Patent Publication No. 2009-0220742 discloses a reflective film having improved brightness, which may include a polyacrylate resin and contains a UV curable resin comprising at least one acrylic monomer.

DISCLOSURE

Technical Problem

An object of the present invention is to provide an optical film which has high refractive index, high brightness, and excellent scratch resistance.

Another object of the present invention is to provide an optical film which has that both high brightness and high viewing angle.

A further object of the present invention is to provide an optical film can improve efficiency of the light source.

A further object of the present invention is to provide an optical film which has high brightness when it produced by using a resin composition of low refractive index.

A further object of the present invention is to provide an optical film can solve the problems in terms of dispersibility and color coordinate uniformity comes from inorganic fluorescent materials.

A further object of the present invention is to provide an optical film which has excellent handling property and low production cost.

A further object of the present invention is to provide an optical film which has excellent heat stability and which demonstrated excellent reliability in view of mold release properties from the engraving roll, and can minimize the rate of defective product caused by foreign materials in assembling process of backlight.

A further object of the present invention is to provide an optical display apparatus including the optical film.

Technical Solution

One aspect of the present invention provides an optical film including a base film and an optical functional layer formed on the base film, wherein at least one of the base film and the optical functional layer may include a luminescent material. Here, the luminescent material may include at least one of a fluorescent material and a phosphorescent material.

The luminescent material may have an absorption wavelength from about 240 nm to about 380 nm or from about 420 nm to about 480 nm, and a light emission wavelength of about 520 nm to about 580 nm.

The luminescent material may include a UV-curable functional group.

The optical film may include a fluorene group.

Another aspect of the present invention provides an optical display apparatus including the optical film.

Advantageous Effects

The present invention provides an optical film which has high refractive index, high brightness, excellent scratch resistance, excellent adhesion to the base film, and suitable viscosity for the process of optical film. And the optical film provides an environment-friendly halogen-based resin composition for optical film, excellent reliability in view of mold release properties from the engraving roll, and can minimize the rate of defective product caused by foreign materials in assembling process of backlight.

The present invention also provides a method for preparing the optical film.

BRIEF DESCRIPTION OF DRAWING

FIG. 1 is a perspective view of an optical film according to one embodiment of the present invention.

BEST MODE

In one embodiment of the present invention, an "optical film" may include a base film and an optical functional layer formed on the base film.

The base film may be integrally formed with the optical functional layer.

FIG. 1 is a perspective view of an optical film according to one embodiment of the present invention. Referring to FIG. 1, the optical film 100 may include a base film 110 and an optical functional layer 120 formed on the base film 110. FIG. 1 shows that the optical functional layer may include two optical patterns. However, the optical functional layer may include at least two optical patterns.

In one aspect of the present invention, the optical film may include at least one luminescent material of a fluorescent material and a phosphorescent material. The luminescent material may be included in at least one of the base film and the optical functional layer. The luminescent material may absorb light in a specific wavelength range to improve brightness of the optical film. Further, the luminescent material has high index of refraction to ensure high index of refraction of the optical film, thereby eliminating the need for the use of resins having high index of refraction.

The luminescent material may include a material having luminescent properties, which may be excited by a light emission wavelength range of CCFL or LED lamp used as a light source in a backlight unit.

The luminescent material may include a material which absorbs light in a blue color or UV wavelength band and emits light in a green color wavelength band. More particularly, the luminescent material may have an absorption wavelength ranging from about 240 nm to about 380 nm or from about 420 nm to about 480 nm, and an emission wavelength from about 520 nm to 580 nm. As used herein, the terms "absorption wavelength" and "emission wavelength" may refer to values determined using a low concentration of a sample (conventionally, 0.02 g/100 ml sample) in THF, $CH_2Cl_2$, or a mixture solvent thereof.

The kind of luminescent material included in an optical film may depend on the kind of light source of a backlight unit which includes the optical film. This is because the amount of light emitted from the backlight unit is adjusted while being reflected or transmitted through the optical film. The backlight unit generally may employ an LED or CCFL as a light source.

When the backlight unit includes a LED lamp as a light source, the optical film may comprise the luminescent material which absorbs light in a blue color wavelength band and emits light in a green color wavelength band. More particularly, the luminescent material having an absorption wavelength from about 420 nm to about 480 nm and an emission wavelength from about 520 nm to about 580 nm may be used. When the backlight unit includes a CCFL as a light source, the optical film may comprise the luminescent material which absorbs light in a UV wavelength band and emits light in a green color wavelength band. More particularly, the luminescent material having an absorption wavelength from about 240 nm to about 380 nm and an emission wavelength from about 520 nm to about 580 nm may be used.

The luminescent material may include an organic fluorescent or phosphorescent material, or an organic-inorganic hybrid fluorescent or phosphorescent material. The organic-inorganic hybrid fluorescent or phosphorescent material may mean a luminescent material including both an organic component and an inorganic component in one material.

Inorganic fluorescent or phosphorescent material may absorb light in a specific range among R, G, and B emitted from a light source, for example, an LED lamp. Accordingly, in order to improve efficiency of the light source, multiple inorganic fluorescent materials should be used so as to supplement wavelength absorption for each of R, G and B. However, in the case of including a plurality of inorganic fluorescent materials in a resin for optical film, there may be problems in terms of dispersibility and color coordinate uniformity. On the contrary, the organic luminescent material alone may exhibit complementary effect of wavelength absorption for R, G and B.

The fluorescent material may include at least one selected from coumarin derivatives, pyran derivatives, quinacridone derivatives, aminoanthracene derivatives, naphthacene derivatives, phenylene vinylene derivatives, fluorene derivatives, naphthalene vinylene, and peri-naphthalene. Specifically, the fluorescent material may include at least one of 2,3,6,7-tetrahydro-1,1,7,7-tetramethyl-1H,5H,11H-10-(2-benzothiazolyl)quinolizino[9,9a,1gh]coumarin (product name: C545T) (Formula 1), 4-(dicyanomethylene)-2-tert-butyl-6-(1,1,7,7-tetramethyljulolidin-4-yl-vinyl)-4H-pyran (E), N,N'-dimethyl-quinacridone (product name: DMQA) (Formula 2), 9,10-bis[N,N-di-(p-tolyl)-amino]anthracene (product name: TTPA) (Formula 3), 9,10-bis[phenyl(m-tolyl)-amino]anthracene (product name: TPA) (Formula 4), 5,6,11,12-tetraphenyl naphthacene (product name: Rubrene) (Formula 5), poly(p-phenylene vinylene) (PPV) (Formula 6), polyfluorene, poly(naphthalene vinylene) (PNV), poly peri-naphthalene (PPN), and mixtures thereof.

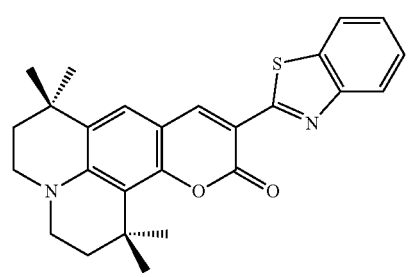

[Formula 1]

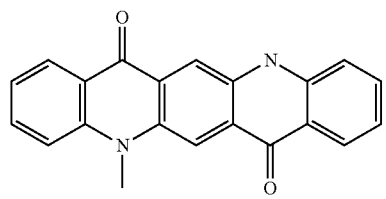

[Formula 2]

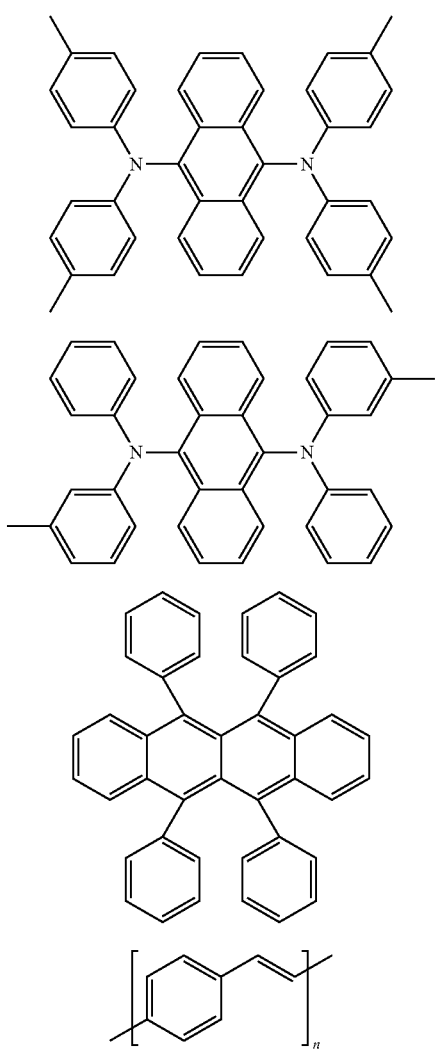

[Formula 3]

[Formula 4]

[Formula 5]

[Formula 6]

(wherein n is an integer ranging from 100 to 500). The phosphorescent material may include pyridine iridium derivatives. Specifically, the phosphorescent material may include at least one of tris[2-(p-tolyl)pyridine]iridium(III); Ir(mppy)3) (Formula 7), Ir(piq)3 (Formula 8), bis[3,5-difluoro-2-(2-pyridyl)phenyl](2-carboxypyridyl)iridium(III) (product name: FlrPic) (Formula 9), Tris(2-phenylpyridine) iridium(III) (product name: Ir(ppy)3) (Formula 10), and mixtures thereof.

[Formula 7]

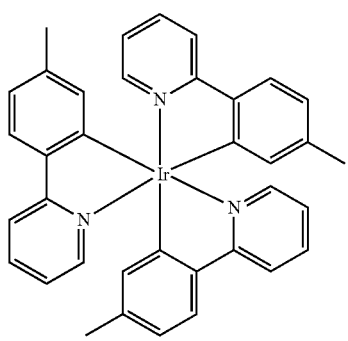

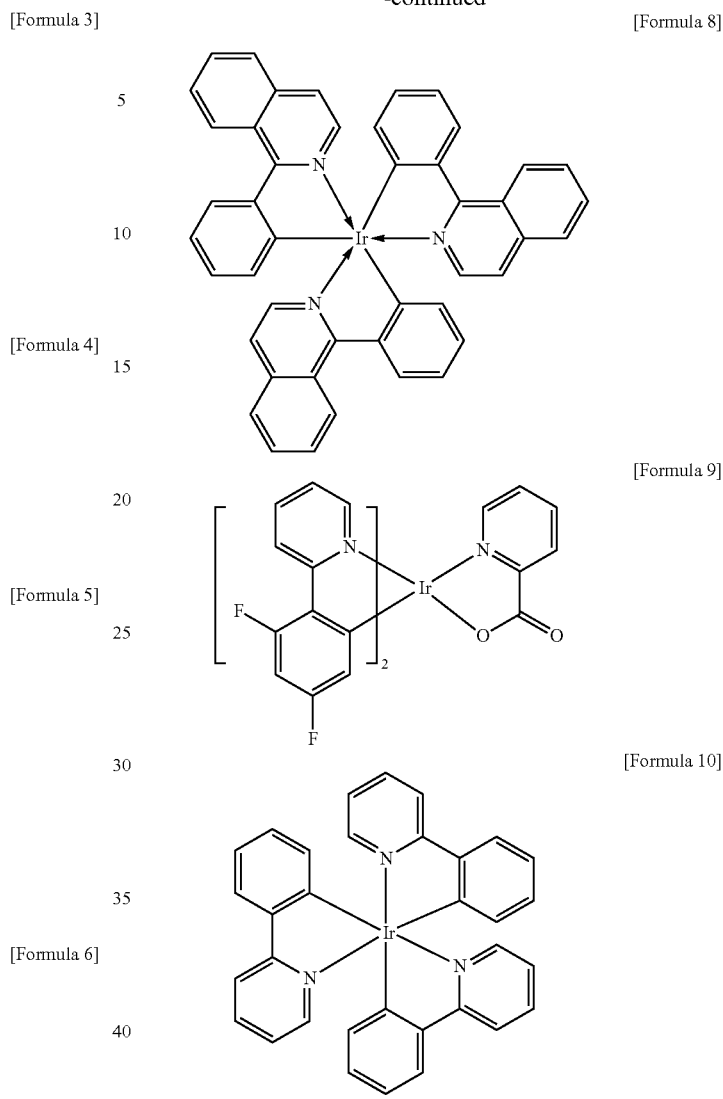

[Formula 8]

[Formula 9]

[Formula 10]

The luminescent material may include a UV-curable unsaturated functional group. The UV-curable unsaturated functional group may be a vinyl group and the like, without being limited thereto. When the luminescent material includes the UV-curable unsaturated functional group, curing reaction with a UV-curable unsaturated compound below may be carried out, thereby improving strength and durability of the optical film together with brightness.

The luminescent material may be present in an amount of about 0.001 wt % to about 0.5 wt %, or about 0.001 wt % to about 0.1 wt % in the optical film. Within this range, brightness may be improved.

The luminescent material may be present in an amount of about 0.001 wt % to about 0.5 wt %, or about 0.001 wt % to about 0.1 wt % in the base film. Within this range, brightness may be improved.

The luminescent material may be present in an amount of about 0.001 wt % to about 0.5 wt %, or about 0.001 wt % to about 0.1 wt % in the optical functional layer. Within this range, brightness may be improved.

In one embodiment, the optical functional layer may be a cured product of a resin composition including the luminescent material. For example, the resin composition may include the luminescent material, the UV-curable unsaturated compound, an initiator, and the like, as described below. In particular, the UV-curable unsaturated compound include a fluorene derivative unsaturated resin; and at least one of phenoxybenzyl (meth)acrylate, phenylphenoxyethyl (meth)acrylate, ethoxylated thiodiphenyl di(meth)acrylate, phenylthioethyl (meth)acrylate monomers, and oligomers thereof, whereby adhesion to the base film can be increased together with surface hardness of the optical functional layer.

The optical functional layer may have functions of collecting, diffusing, transmitting, refracting or reflecting light, whereby the optical film can be used as a prism sheet, a diffusive sheet, a light guide plate, or the like.

The optical functional layer may have an optical pattern so as to have the functions of collecting, diffusing, transmitting, and refracting light. The optical pattern may include at least one of prisms, lenticular lenses, micro-lenses, and embossed shapes, without being limited thereto.

In the optical functional layer, the concentration of luminescent material may increase with increasing distance from a light source.

The optical functional layer may have a thickness (or height) of about 1 μm to about 1,000 μm, or about 1 μm to about 300 μm.

In one embodiment, the base film may be a resin film of a transparent material, and may be comprised of glass, transparent synthetic resins, and the like. Generally, the transparent synthetic resin may comprise polyethylene terephthalate. The base film may have a thickness of about 30 μm to about 300 μm.

The optical film may be produced by using a resin composition for an optical film. The resin composition for an optical film may be used for preparing the base film or the optical functional layer in the optical film.

In one embodiment, the method of producing an optical film may include: (a) coating the resin composition for an optical film on a mold engraving roll to form a coating layer; (b) bring the coating layer into contact with one side of a base film; (c) UV irradiating the base film to cure the coating layer; and (d) separating the coating layer, which is cured and attached to the base film, from the engraving roll.

The base film may be a transparent base film in consideration of utility thereof.

The coating layer may have a thickness of about 0.1 μm to about 1,000 μm, about 1 μm to about 300 μm, about 0.1 μm to 50 about μm, about 20 μm to about 50 μm, or about 35 μm to about 40 μm.

In another embodiment, the method of producing an optical film may include: (a) coating the resin composition for a base film on a release film to form a first coating layer; (b) coating a composition for an optical functional layer on a mold engraving roll to form a second coating layer; (c) bringing the second coating layer into contacting with one side of the first coating layer; (d) UV irradiating the first or second coating layer to cure the first and second coating layers; and (e) separating the cured first and second coating layers from the mold engraving roll.

The resin composition for an optical functional layer may include a UV-curable unsaturated compound and an initiator. The resin composition for an optical functional layer is not particularly limited so long as it is used for the production of a film for collection, diffusion, transmission, refraction or reflection of light.

The resin composition for an optical film or the resin composition for an optical functional layer may be cured by UV irradiation at a wavelength of about 190 nm to about 400 nm and an intensity of about 150 mJ/cm$^2$ to about 500 mJ/cm$^2$, without being limited thereto.

The resin composition for an optical film may include a luminescent material, a UV-curable unsaturated compound, and an initiator.

The luminescent material may be present in an amount of about 0.001 parts by weight to about 0.5 parts by weight, about 0.001 parts by weight to about 0.1 parts by weight, about 0.01 parts by weight to about 0.1 parts by weight, or about 0.005 parts by weight to about 0.07 parts by weight, based on 100 parts by weight of the UV-curable unsaturated compound described below. Within this range, the luminescent material may have sufficient light emission efficiency without changing color coordinates (x: ±30/1000, y: ±30/1000), thereby improving brightness.

The luminescent material may be present in an amount of about 0.001 parts by weight to about 0.5 parts by weight, about 0.001 parts by weight to about 0.1 parts by weight, or about 0.005 parts by weight to about 0.1 parts by weight, based on 100 parts by weight of the composition in terms of solid content. Within this range, brightness can be improved.

The UV-curable unsaturated compound may be an independent single component, or a complex component in which the UV-curable unsaturated compound is chemically bonded to the luminescent material.

The UV-curable unsaturated compound may have an index of refraction of in which 1.61 or less, or from about 1.52 to about 1.605.

The UV-curable unsaturated compound may have an Abbe's number of about 1.45 to about 1.60.

The UV-curable unsaturated compound may include mono-functional or polyfunctional UV-curable monomers, or oligomers thereof. With this component, mold release properties of a soft mold or a nickel plated metal mold from the engraving roll may be improved. Further, after curing, adhesion to the transparent base film at room temperature or under high temperature/high humidity circumstances may be improved, and surface hardness of the prism shape may be enhanced.

The UV-curable unsaturated compound may be a mono-functional or a polyfunctional (meth)acrylate oligomer, a mono-functional or polyfunctional (meth)acrylate monomer, or mixtures thereof.

As the (meth)acrylate oligomer, typical (meth)acrylate oligomers may be used without limitation. For instance, a (meth)acrylate oligomer having a weight average molecular weight from about 1,000 g/mol to about 100,000 g/mol may be used.

Examples of the (meth)acrylate oligomer may include fluorene (meth)acrylates, urethane (meth)acrylates, epoxy (meth)acrylates, polyester (meth)acrylates, fluorine (meth)acrylates, silicone (meth)acrylates, phosphate (meth)acrylates, maleimide modified (meth)acrylates, and acrylate (methacrylate). These may be used alone or in combination of two or more thereof.

The fluorene (meth)acrylates (fluorene derivative unsaturated resin) may include a fluorene structure and (meth)acrylate as an unsaturated group.

The urethane (meth)acrylates may include an oligomer which is synthesized from a polyol, an isocyanate compound and a (meth)acrylate and has a urethane bond in the molecular structure thereof. Examples of the polyol may include a polyester polyol, a polyether polyol, a polycarbonate polyol, a polycaprolactone polyol, a tetrahydrofurane propylene oxide ring-opening copolymer, polybutadiene diol, polydimethylsiloxane diol, ethylene glycol, propylene glycol, 1,4-butanediol, 1,5-pentanediol, 1,6-hexanediol, neopentyl glycol, 1,4-cyclohexane dimethanol, bisphenol-A, hydrogenated bisphenol-A, and mixtures thereof. Examples of the isocyanate compound may include 2,4-toluene diisocyanate, 1,3-xylene diisocyanate, 1,4-xylene diisocyanate, 1,5-naphthalene diisocyanate, 1,6-hexane diisocyanate, isophorone diisocyanate, and mixtures thereof. Examples of the (meth) acrylate may include (meth)acrylates containing a C1 to C50 alkyl group and a hydroxyl group.

The epoxy (meth)acrylate may be selected from (meth) acrylate oligomers, the intermolecular structure of which includes a backbone of 2-bromohydroquinone, resorcinol, catechol, bisphenols such as bisphenol A, bisphenol F, bisphenol AD and bisphenol S, 4,4'-dihydroxybiphenyl, bis(4-hydroxyphenyl)ether, and the like; and (meth)acrylate oligomers, the intermolecular structure of which includes an alkyl, aryl, methylol, allyl, cycloaliphatic, halogen (tetrabromobisphenol A), nitro group, and the like.

The maleimide modified (meth)acrylate may refer to an oligomer prepared from a (meth)acrylate and a compound having at least two maleimide groups. The (meth)acrylate may comprise a (meth)acrylate having a $C_1$ to $C_{50}$ alkyl group. The compound having at least two maleimide groups may comprise at least one selected from the group consisting of 1-methyl-2,4-bismaleimidebenzene, N,N'-m-phenylenebismaleimide, N,N'-p-phenylenebismaleimide, N,N'-m-toluoylenebismaleimide, N,N'-4,4-biphenylenebismaleimide, N,N'-4,4-(3,3'-dimethylbiphenylene)bismaleimide, N,N'-4,4-(3,3'-dimethyldiphenylmethane)bismaleimide, N,N'-4,4-(3,3'-diethyldiphenylmethane)bismaleimide, N,N'-4,4-diphenylmethane bismaleimide, N,N'-4,4-diphenylpropanebismaleimide, N,N'-4,4-diphenyletherbismaleimide, 2,2-bis(4-(4-maleimidephenoxy)phenyl)propane, 2,2-bis(3-t-butyl-4-(4-maleimidephenoxy)phenyl)propane, 1,1-bis(4-(4-maleimidephenoxy)phenyl)decane, 4,4'-cyclohexylidene bis(1-(4-maleimidephenoxy)-2-cyclohexylbenzene, 2,2-bis (4-(4-maleimidephenoxy)phenyl)hexafluoropropane, and mixtures thereof.

The (meth)acrylate oligomer may include fluorene (meth) acrylate oligomers.

As the (meth)acrylate monomer, any (meth)acrylate monomer typically used in the art may be used without limitation.

For example, the (meth)acrylate monomer may be at least one selected from benzyl (meth)acrylate, phenoxybenzyl (meth)acrylate, phenylphenoxyethyl (meth)acrylate, 1,6-hexanediol mono(meth)acrylate, 2-hydroxyethyl (meth) acrylate, 2-hydroxypropyl (meth)acrylate, 2-hydroxybutyl (meth)acrylate, 2-hydroxy-3-phenyloxypropyl (meth)acrylate, 1,4-butanediol (meth)acrylate, 2-hydroxyethyl (meth) acryloyl phosphate, 4-hydroxycyclohexyl (meth)acrylate, neopentylglycol mono(meth)acrylate, trimethylolethane di(meth)acrylate, trimethylolpropane di(meth)acrylate, pentaerythritol tri(meth)acrylate, pentaerythritol tetra(meth) acrylate, dipentaerythritol penta(meth)acrylate, dipentaerythritol hexa(meth)acrylate, glycerin di(meth)acrylate, tetrahydrofurfuryl (meth)acrylate, iso-decyl (meth)acrylate, 2-(2-ethoxyethoxy)ethyl (meth)acrylate, stearyl (meth)acrylate, lauryl (meth)acrylate, 2-phenoxyethyl (meth)acrylate, isobornyl (meth)acrylate, tridecyl (meth)acrylate, ethoxy addition type nonylphenol (meth)acrylate, ethylene glycol di(meth)acrylate, diethylene glycol di(meth)acrylate, triethylene glycol di(meth)acrylate, t-ethylene glycol di(meth) acrylate, polyethylene glycol di(meth)acrylate, 1,3-butylene glycol di(meth)acrylate, tripropylene glycol di(meth)acrylate, ethoxy addition type bisphenol-A di(meth)acrylate, cyclohexane dimethanol di(meth)acrylate, phenoxy-t-glycol (meth)acrylate, 2-methacryloyloxyethyl phosphate, dimethylol tricyclodecane di(meth)acrylate, trimethylolpropane benzoate (meth)acrylate, fluorene (meth)acrylate, bisphenol F (meth)acrylate, bisphenol A epoxy (meth)acrylate, novolac epoxy (meth)acrylate, phenylphenoxyethyl (meth) acrylate, ethoxylated thiodiphenyl di(meth)acrylate, phenylthioethyl (meth)acrylate, and mixtures thereof.

In one embodiment, the UV-curable unsaturated compound may include a mixture of a (meth)acrylate oligomer and a (meth)acrylate monomer. The (meth)acrylate oligomer may include a fluorene derivative unsaturated resin, and the (meth)acrylate monomer may include one or more of phenoxybenzyl (meth)acrylate, phenylphenoxyethyl (meth) acrylate, ethoxylated thiodiphenyl di(meth)acrylate, phenylthioethyl (meth)acrylate, or mixtures thereof.

In the mixtures, the (meth)acrylate oligomer may be present in the same or greater amount than the (meth) acrylate monomer such that the weight ratio of the (meth) acrylate oligomer to the (meth)acrylate monomer may be about 1 or more, preferably from about 1 to about 2.

In one embodiment, the UV-curable unsaturated compound may include about 100 parts by weight of the (meth) acrylate oligomer, and about 30 parts by weight to about 100 parts by weight, 50 parts by weight to about 100 parts by weight of the (meth)acrylate monomer or the oligomer prepared therefrom. Within this range, the compound may have a viscosity of 1000 cPs or less suitable for the process and can prevent decrease of an index of refraction while ensuring flexibility of a polymer main chain, thereby preventing occurrence of cracking after film production.

The UV-curable unsaturated compound may be present in an amount of about 90 parts by weight to about 99 parts by weight, about 95 parts by weight to about 98 parts by weight in 100 parts by weight of the composition in terms of solid content. Within this range, brightness can be improved.

The initiator may be used to cure a resin composition for an optical film to form an optical film. Photopolymerization initiators, radical initiators, and the like may be used. Examples of the initiator include propanone, ketone, phosphine oxide, formate, and phosphate initiators, without being limited thereto.

The initiator may be present in an amount of about 0.01 parts by weight to about 10 parts by weight, about 0.1 parts by weight to about 10 parts by weight, or about 2 parts by weight to about 5 parts by weight, based on 100 parts by weight of the UV-curable unsaturated compound. Within this range, high photo-reactivity can be obtained without deterioration in mechanical strength of the optical film, and the residual initiator may prevent deterioration of the optical properties.

The initiator may be present in an amount of about 0.5 parts by weight to about 9.5 parts by weight, or about 1 part by weight to about 4 parts by weight in 100 parts by weight of the composition. Within this range, the mechanical properties of the prism may be ensured due to sufficient photoreactivity, and the deterioration of optical properties such as yellowing of the optical film may be prevented.

The resin composition for an optical film may further include ester type reactive additives.

The ester reactive additives may enhance adhesion to the base film after curing the composition for the optical film.

Examples of the ester reactive additives may include ester type (meth)acrylate, such as polyester modified polysiloxane (meth)acrylate, polyester hydroxyl dimethylpolysiloxane (meth)acrylate, and mixtures thereof, without being limited thereto. Examples of commercially available ester reactive additives may include ECX4114, ECX5031, ECX6025, PHOTOMER4846 (COGNIS Co., Ltd.), and the like.

The ester reactive additives may be present in an amount of about 0.5 parts by weight to about 5 parts by weight, or about 0.6 parts by weight to about 3 parts by weight based on 100 parts by weight of the UV-curable unsaturated compound. Within this range, adhesion to the transparent base film after curing the composition for the optical film may be improved, and decrease of the index of refraction of the prism film may be prevented.

The resin composition for the optical film may further include a silicone reactive resin.

The silicone reactive resin may improve mold release properties upon releasing the composition from a mold. As the silicone reactive resin, typical polyether siloxane copolymers or organic modified polysiloxane compounds may be used. Examples of commercially available silicone reactive resins may include BYK UV-3500, BYK UV-3530 (all available from BYK Co., Ltd.), or TEGO Glide-100, TEGO Glide-ZG400, TEGO Glide-450 (all available from TEGO Co., Ltd.), and the like.

The silicone reactive resin may be present in an amount of about 0.01 wt % to about 8 wt % in the composition in terms of solid content. Within this range, mold release properties can be improved without deterioration in adhesion between interfaces under high temperature/high humidity conditions and mechanical and optical properties of prisms. For example, the silicone reactive resin is present in an amount of about 0.01 wt % to about 2 wt %.

The resin composition for the optical film may further include typical additives.

The additives may be selected from the group consisting of antistatic agents, antioxidants, UV absorbers, light stabilizers, polymerization inhibitors, leveling agents, surfactants and, lubricants.

The resin composition for the optical film may have an index of refraction of about 1.55 or more, or about 1.556 to about 1.582 as measured using a D light sodium lamp emitting light having a wavelength of 589.3 nm.

The resin composition for the optical film may have a viscosity from about 100 cps to about 1,000 cps at 25° C.

In a further aspect of the present invention, an optical display apparatus may include the optical film. In the optical display apparatus, the optical film may be included as a prism sheet, a diffusive sheet or a light guide plate. The optical display apparatus may include a liquid crystal display wherein a light source in the liquid crystal display may include a LED lamp or a CCFL.

Next, the constitution and functions of the present invention will be explained in more detail with reference to the following examples. These examples are provided for illustration only and are not to be construed in any way as limiting the present invention. Descriptions of details apparent to those skilled in the art will be omitted here.

MODE FOR INVENTION

Examples

Details of components used in Examples and Comparative Examples are as follows:
(A) Luminescent Material:
(A1) N,N'-dimethyl-quinacridone (DMQA, LT-E503) (absorption wavelength: 294.510 nm (in THF), light emission wavelength: 523 nm (in THF))
(A2) 9,10-bis[N,N-di-(p-tolyl)-amino]anthracene (TTPA, LT-N507) (absorption wavelength: 294.471 nm (in $CH_2Cl_2$), light emission wavelength: 554 nm (in $CH_2Cl_2$))
(A3) 9,10-bis[phenyl(m-tolyl)-amino]anthracene (TPA, LT-N508) (absorption wavelength: 292.458 nm (in $CH_2Cl_2$), light emission wavelength: 532 nm (in $CH_2Cl_2$))
(A4) 2,3,6,7-tetrahydro-1,1,7,7-tetramethyl-1H,5H,11H,10-[2-benzothiazolyl]quinolizino[9,9a,1gh]coumarin (C545T, LT-E502) (absorption wavelength: 473 nm (in THF), light emission wavelength: 506 nm (in THF))
(A5) Tris[2-(p-tolyl)pyridine]iridium(III); Ir(mppy)3
(B) UV-Curable Unsaturated Compound:
(B1) Fluorene derivative unsaturated resin (BPF-022, HANNONG CHEMICALS INC., index of refraction: 1.601)
(B21) Phenoxybenzyl acrylate (Index of refraction: 1.56)
(B22) Phenylphenoxy ethyl acrylate (Index of refraction: 1.54)
(C) Initiator:
(C1) Irgacure 184
(C2) Darocure TPO
(C3) Irgacure 1174
(D) Ester reactive additive: Ester acrylate (ECX4114)
(E) Inorganic fluorescent material: produced by DUKSAN HI-METAL CO., LTD.
(E1) DPP-201R (Composition (Y, Gd) BO3: Eu, light emission wavelength: Red, 593 nm)
(E2) DPP-501B (Composition is BaMgA110017: Eu, light emission wavelength: Blue, 450 nm)

Examples 1-12

Compositions for optical films were prepared by mixing a UV-curable unsaturated compound and an initiator in amounts as listed in Tables 1 and 2, adding a luminescent material to the resulting mixture and mixing the same by means of a stirrer.

Comparative Example 1

A composition for an optical film was prepared in the same manner as in Example 1 except that the luminescent material was not used.

Comparative Examples 2-3

Compositions for optical films were prepared in the same manner as in Example 1 except that inorganic fluorescent material E-1 (Comparative Example 2) or E-2 (Comparative Example 3) was used instead of the luminescent material.

Comparative Example 4

A composition for an optical film was prepared in the same manner as in Example 9 except that the luminescent material was not used.

Preparation of Optical Film

The resin composition for an optical film prepared above was coated on a metal mold having a prism layer engraved thereon, subjected to UV irradiation at an intensity of 250 $mJ/cm^2$ to 500 $mJ/cm^2$ and a wavelength of 190 nm to 400 nm from an electrodeless UV irradiator (600 W/inch) equipped with a D-type bulb with one side of the transparent PET base film (polyethylene terephthalate film) contacting the coating layer on the engraved mold to photocure the composition. The cured coating layer adhered to the transparent base film was released from the metal mold to obtain an optical film having a prism layer on one side of the base film. The height of the optical film was adjusted to 35 μm to 40 μm.

The produced optical films were tested as to physical properties as explained below. Results are summarized in Tables 1 and 2.

(1) Index of refraction: A refractometer (Model: 1T, ATAGO ABBE, Japan) was used to measure an index of refraction of the composition. A D-type sodium lamp of 589.3 nm was used as a light source.

(2) Brightness (Cd/m$^2$): The prism film was fixed to a backlight unit for 32 inch liquid crystal display panels. Then, brightness was measured at 13 points and 5 points on the liquid crystal display panel using a spectrophotometer (Model: SR3, TOPCON Company, Japan) and the measured values were averaged. In the backlight unit, an LED lamp and a CCFL lamp were separately used to measure brightness 1 and brightness 2, respectively. In addition, the prism film was fixed to a backlight unit for 15.6 inch liquid crystal display panels. Then, brightness was measured at 13 points and 5 points on the liquid crystal display panel using a spectrophotometer (Model: BM-7, TOPCON Company, Japan) and the measured values were averaged (brightness 3).

(3) Viewing angle: The same apparatus employed to measure the brightness was used with a slope of 0° to 180° from right to left to measure the viewing angle. In the backlight unit, an LED lamp and a CCFL lamp were separately used to measure viewing angle 1 and viewing angle 2, respectively.

(4) Dispersibility: With the existing UV resin composition, a fluorescent additive was mixed, or a fluorescent additive as a high polarity monomer was dispersed using a centrifugal separator or a stirrer, and then compositions were mixed in accordance with resin component ratio. After 24 hours at room temperature, dispersibility was evaluated according to the presence of precipitates. When dispersibility was determined to be good, it was evaluated as O, and when dispersibility was determined not to be good, it was eavluated as X.

(5) Color coordinate: The color coordinates were measured together with brightness using a spectrophotometer as indicated in the above item (2).

(6) UV yellowing: UV yellowing was measured using a yellowing tester SMCM-H5K1 (Sei-myung Vactron Co. Ltd.) after UV irradiation at 68 mW/m$^2$ and 125 J under a UV lamp having a wavelength of 340 nm at room temperature and being left for 1 hour.

(7) Adhesive force: After coating and curing a resin composition on a transparent PET base film, the base film was removed. The cured layer was cut into 100 matrix cells each having an area of 10×10 mm$^2$. A tape was attached to the cells and the number of cells released from the tape was measured when vertically releasing the layer. When the adhesive force was determined to be good, it was rated as 0, and when the adhesive force was determined not to be good, it was rated as X.

(8) Mold release properties: The composition as mentioned in the examples of the present invention was introduced between a polyester base film and a metal mold having a prism shape engraved thereon. After lamination, the mold release properties upon releasing the base film from the metal mold were evaluated on a scale of 0 to 10, 10 being defined as excellent mold release properties.

(9) Scratch resistance (g): After coating and curing a composition on a transparent PET base film, the cured prism layer was turned over so as to contact an antiglare side, on which a weight of 0 g to 100 g was placed. The weight was reciprocated a distance of 5 cm three times and the mass when the prism layer started to be scratched was measured.

TABLE 1

| | | Example | | | | | | | | Comparative Example | | |
|---|---|---|---|---|---|---|---|---|---|---|---|---|
| | | 1 | 2 | 3 | 4 | 5 | 6 | 7 | 8 | 1 | 2 | 3 |
| A | A1 | 0.1 | 0.01 | — | — | — | — | — | — | — | — | — |
| | A2 | — | — | 0.1 | 0.01 | — | — | — | — | — | — | — |
| | A3 | — | — | — | — | 0.1 | 0.01 | — | — | — | — | — |
| | A4 | — | — | — | — | — | — | 0.1 | 0.01 | — | — | — |
| | A5 | — | — | — | — | — | — | — | — | — | — | — |
| B | B1 | 50 | 50 | 50 | 50 | 50 | 50 | 50 | 50 | 50 | 50 | 50 |
| | B21 | 20 | 20 | 20 | 20 | 20 | 20 | 20 | 20 | 20 | 20 | 20 |
| | B22 | 30 | 30 | 30 | 30 | 30 | 30 | 30 | 30 | 30 | 30 | 30 |
| C | C1 | 1 | 1 | 1 | 1 | 1 | 1 | 1 | 1 | 1 | 1 | 1 |
| | C2 | 3 | 3 | 3 | 3 | 3 | 3 | 3 | 3 | 3 | 3 | 3 |
| | C3 | — | — | — | — | — | — | — | — | — | — | — |
| | D | — | — | — | — | — | — | — | — | — | — | — |
| E | E1 | — | — | — | — | — | — | — | — | — | 0.1 | — |
| | E2 | — | — | — | — | — | — | — | — | — | — | 0.1 |
| | Index of refraction | 1.558 | 1.556 | 1.558 | 1.556 | 1.558 | 1.556 | 1.558 | 1.556 | 1.556 | 1.558 | 1.558 |
| | Brightness 1 (cd/cm$^2$) | 6450 | 5940 | 6350 | 5870 | 6560 | 5960 | 6535 | 5865 | 5450 | 4500 | 4200 |
| | Brightness 2 (cd/cm$^2$) | 5900 | 5300 | 5950 | 5350 | 6000 | 5400 | 6150 | 5500 | 4950 | 4500 | 4200 |
| | Viewing angle 1 (right/left) angle | 65 | 65 | 65 | 65 | 65 | 65 | 65 | 65 | 65 | 65 | 65 |
| | Viewing angle 2 (right/left) angle | 65 | 65 | 65 | 65 | 65 | 65 | 65 | 65 | 65 | 65 | 65 |
| | Dispersibility | ◯ | ◯ | ◯ | ◯ | ◯ | ◯ | ◯ | ◯ | ◯ | X | X |
| | Color coordinate (Δy) | 8/100 | 9/1000 | 8/1000 | 5/1000 | 9/100 | 8/1000 | 9/1000 | 5/1000 | 3/1000 | 7/100 | 3/100 |

As shown in Table 1, the optical film of the present invention had high brightness as compared to the comparative examples including inorganic fluorescent materials, and showed no problems in dispersibility of inorganic fluorescent materials or color coordinate uniformity.

TABLE 2

| | | Example | | | | Comparative |
|---|---|---|---|---|---|---|
| | | 9 | 10 | 11 | 12 | Example 4 |
| A | A1 | — | — | — | — | — |
| A | A2 | — | — | — | — | — |
| A | A3 | — | — | — | — | — |
| A | A4 | 0.1 | 0.01 | — | 0.1 | — |
| A | A5 | — | — | 0.1 | — | — |
| B | B1 | 100 | 100 | 100 | 80 | 100 |
| B | B21 | 20 | 20 | 20 | 30 | 20 |
| B | B22 | 30 | 30 | 30 | 40 | 30 |
| C | C1 | — | — | — | — | — |
| C | C2 | 3 | 3 | 3 | 3 | 3 |
| C | C3 | 2 | 2 | 2 | 2 | 2 |
| | D | 1.3 | 1.3 | 1.3 | 1.3 | 1.3 |
| E | E1 | — | — | — | — | — |
| E | E2 | — | — | — | — | — |
| Index of refraction | | 1.559 | 1.559 | 1.559 | 1.558 | 1.559 |
| Brightness 3 ($cd/cm^2$) | | 6540 | 6450 | 5870 | 5450 | 5540 |
| UV yellowing ($\Delta YI$) | | 8.0 | 7.6 | 8.2 | 8.3 | 8.5 |
| Adhesive force | | 0 | 0 | 0 | 0 | 0 |
| Mold release properties | | 9 | 9 | 9 | 9 | 9 |
| Scratch resistance (g) | | 5 | 5 | 5 | 15 | 5 |

As shown in Table 2, it could be seen that Examples 9~11 in which a prism thin layer was formed using resin compositions including the luminescent materials of the present invention showed high brightness, about 6% to 25% improved as compared with Comparative Example 4. Further, the index of refraction, yellowing, adhesive force, mold release properties and the like of the prism thin layer were similar to those in the event of not including the luminescent materials. This gave viscosity suited to process conditions, which in turn demonstrated excellent reliability in view of mold release properties from the engraving roll. From this, it can be seen that excellent brightness results may be obtained without using resins having high index of refraction and high viscosity. When comparing Example 12 with Comparative Example 4, it could be seen that Example 12 showed remarkably improved scratch resistance, though brightness was similar. Owing to the brightness enhancing effect by the use of the luminescent materials, the amount of fluorene derivative unsaturated resin having high index of refraction but poor scratch resistance might be reduced, which in turn increased scratch resistance without causing deterioration in brightness.

Although some embodiments have been described herein, the present invention is not limited by these embodiments and can be realized in various ways. Further, it should be understood by those skilled in the art that various modifications, alterations, and equivalent embodiments can be made without departing from the spirit and scope of the invention. Therefore, these embodiments are given by way of illustration only, and should not be construed in any way as limiting the present invention.

The invention claimed is:
1. An optical film, comprising:
   a base film; and
   an optical functional layer formed on the base film, wherein at least one of the base film and the optical functional layer comprises a luminescent material, and the luminescent material includes at least one of 2,3,6,7-tetrahydro-1,1,7,7-tetramethyl-1H,5H,11H-10-(2-benzothiazolyl)quinolizino [9,9a,1gh] coumarin, 4-(dicyanomethylene)-2-tert-butyl-6-(1,1,7,7-tetramethyljulolidin-4-yl-vinyl)-4H-pyran(E), N,N'-dimethyl-quinacridone, 9,10-bis[N,N-di-(p-tolyl)-amino]anthracene, 9,10-bis[phenyl(m-tolyl)-amino]anthracene, 5,6,11,12-tetraphenylnaphthacene, poly (naphthalene vinylene) (PNV), poly peri-naphthalene (PPN), tris[2-(p-tolyl)pyridine]iridium(III), bis[3,5-difluoro-2-(2-pyridyl)phenyl](2-carboxypyridyl)iridium (III), tris(2-phenylpyridine)iridium(III), and a mixture thereof,
   wherein the optical functional layer comprises at least one optical pattern selected from prisms, lenticular lenses, micro-lenses, and embossed shapes.
2. The optical film according to claim 1, wherein the luminescent material has an absorption wavelength from about 240 nm to about 380 nm or from about 420 nm to about 480 nm, and a light emission wavelength from about 520 nm to about 580 nm.
3. The optical film according to claim 1, wherein the luminescent material further includes a UV-curable functional group.
4. The optical film according to claim 1, wherein the at least one of the base film and the optical functional layer of the optical film comprises a fluorene group.
5. The optical film according to claim 1, wherein the luminescent material is present in an amount of about 0.001 wt % to about 0.5 wt % in the optical film.
6. The optical film according to claim 1, wherein the optical film is used as a prism sheet, a diffusive sheet, or a light guide plate.
7. The optical film according to claim 1, wherein the at least one of the base film and the optical functional layer of the optical film comprises a cured product of a resin composition comprising the luminescent material, a UV-curable unsaturated compound, and an initiator.
8. The optical film according to claim 7, wherein the UV-curable unsaturated compound comprises a fluorene derivative unsaturated resin; and at least one selected from the group consisting of phenoxybenzyl (meth)acrylate, phenylphenoxy ethyl (meth)acrylate, phenylthioethyl (meth) acrylate, and mixtures thereof.
9. The optical film according to claim 7, wherein the composition further comprises at least one of an ester reactive additive and a silicone reactive resin.
10. A resin composition for an optical film that includes a base film and an optical functional layer on the base film, the composition comprising:
    a luminescent material;
    a UV-curable unsaturated compound that includes a fluorene group; and
    an initiator,
    wherein the luminescent material includes at least one of 2,3,6,7-tetrahydro-1,1,7,7-tetramethyl-1H,5H,11H-10-(2-benzothiazolyl)quinolizino [9,9a,1gh] coumarin, 4-(dicyanomethylene)-2-tert-butyl-6-(1,1,7,7-tetramethyljulolidin-4-yl-vinyl)-4H-pyran(E), N,N'-dimethyl-quinacridone, 9,10-bis[N,N-di-(p-tolyl)-amino] anthracene, 9,10-bis[phenyl(m-tolyl)-amino]

anthracene, 5,6,11,12-tetraphenylnaphthacene, poly (naphthalene vinylene) (PNV), poly peri-naphthalene (PPN), tris[2-(p-tolyl)pyridine]iridium(III), bis[3,5-difluoro-2-(2-pyridyfiphenyl](2-carboxypyridyl)iridium (III), tris(2-phenylpyridine)iridium(III), and a mixture thereof, and wherein at least one of the base film and the optical functional layer comprises the luminescent material and the UV-curable unsaturated compound in a cured state.

11. The resin composition according to claim 10, further comprising: at least one of an ester reactive resin and a silicone reactive resin.

12. The resin composition according to claim 10, wherein the optical functional layer comprises at least one optical pattern selected from prisms, lenticular lenses, micro-lenses, and embossed shapes.

13. A liquid crystal display apparatus comprising the optical film according to claim 1.

* * * * *